Aug. 18, 1964
A. M. WALKER
3,145,087
FEEDERS FOR DISSOLVING CHEMICALS INTO
INTERMITTENT FLOW FLUID SYSTEMS
Filed May 22, 1961
3 Sheets-Sheet 1
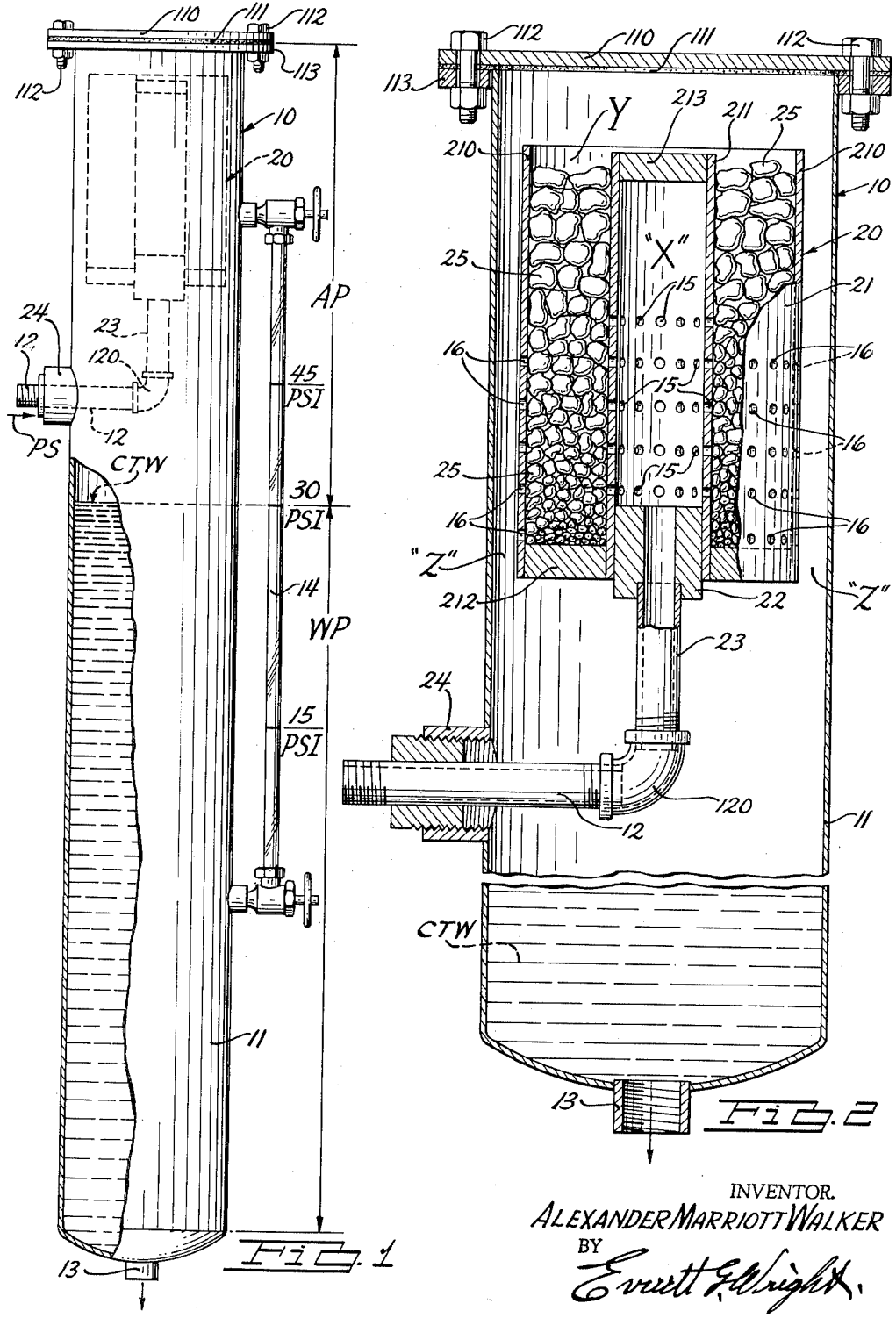
INVENTOR.
ALEXANDER MARRIOTT WALKER
BY
Everett G. Wright
ATTORNEY

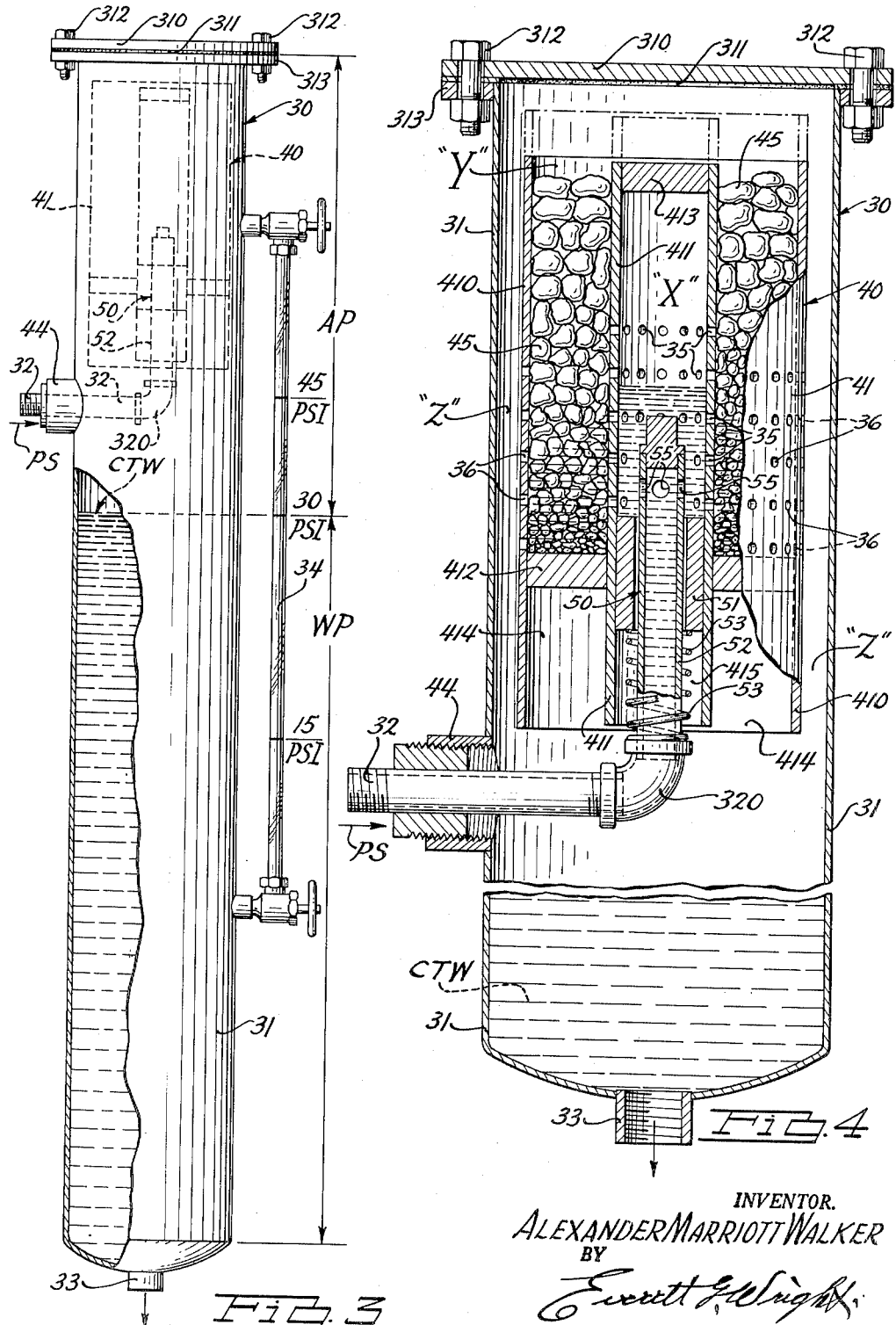

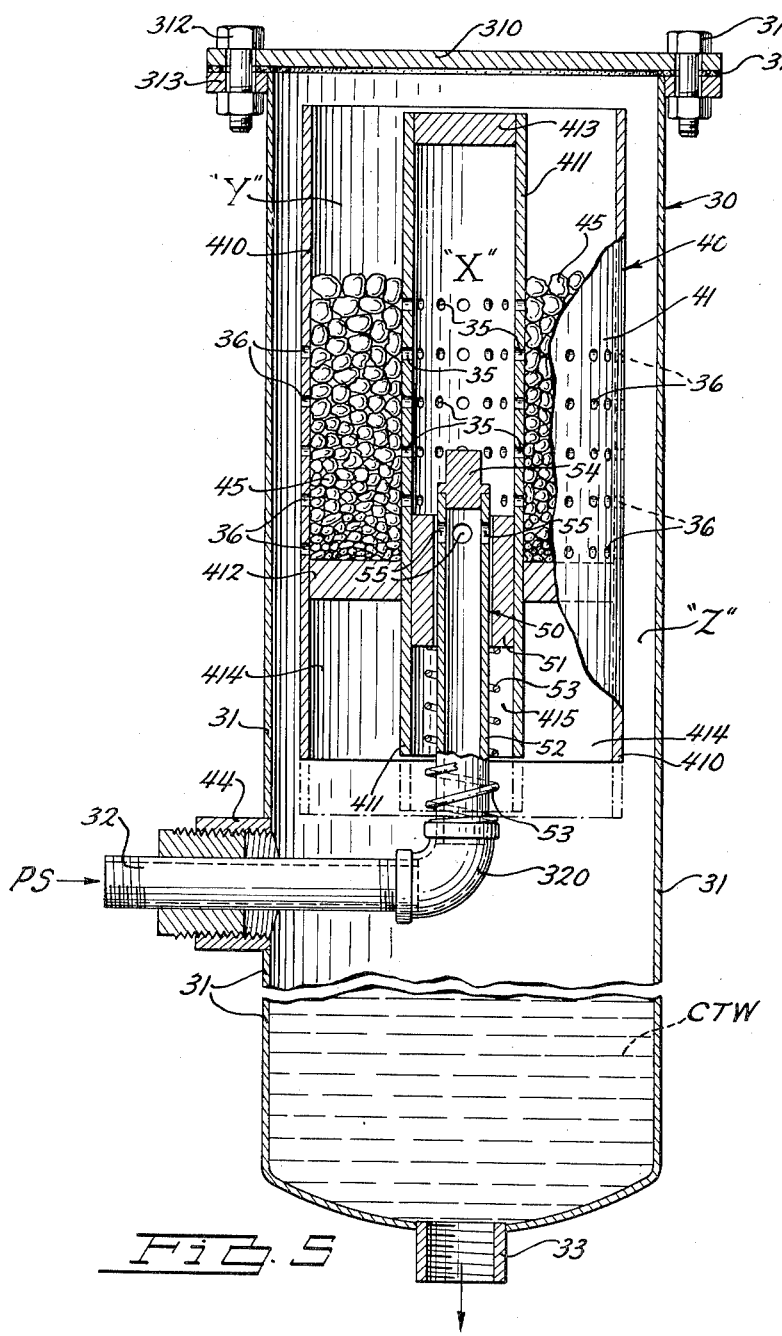

United States Patent Office 3,145,087
Patented Aug. 18, 1964

3,145,087
FEEDERS FOR DISSOLVING CHEMICALS INTO
INTERMITTENT FLOW FLUID SYSTEMS
Alexander Marriott Walker, 699 Shepardbush Road,
Birmingham, Mich.
Filed May 22, 1961, Ser. No. 111,829
4 Claims. (Cl. 23—272.6)

This invention relates to improvements in chemical feeders, and in particular to feeders in which pelletized, lump or relatively large granular chemicals are gradually dissolved, and the solute is uniformly applied to fluids in a pressurized fluid system wherein the fluids, always under pressure, are withdrawn intermittently from the system.

As an example, for illustrative purposes, but not to be interpreted as a limited use, the invention will be disclosed herein in connection with the application of dissolvable chemicals in soluble pelletized or lump form uniformly to a household or industrial water supply system wherein the chemical pellets are normally carried dry and are wetted and dissolved in minutia upon demand withdrawal of water from the water supply system.

Accordingly, the primary object of the instant invention is to provide in a pressurized fluid supply system a chemical feeder for dissolving chemicals in soluble pellet or like form into fluid passing through the pressurized fluid supply system upon intermittent demand therefrom, the chemical content of the fluid withdrawn from the system being substantially uniform.

Another object of the invention is to provide a chemical feeder as aforesaid wherein the chemicals in pellet or like form are normally maintained in a chemical feed means out of contact with fluid in the pressurized fluid supply system, and are placed into dissolving relationship with fluid passing through the said feeder upon and during demand withdrawal of chemically treated fluid therefrom.

Another object of the invention is to provide, in a chemical feeder of the invention, a simple and effective means for interrupting fluid flow therethrough whenever the dissolvable pelletized chemical supply therein is depleted to the extent that a substantial reduction would occur in the chemical content of chemically treated fluid withdrawn from the feeder.

Another object of the invention is to provide a chemical feeder for feeding solutes at a required substantially even rate from pelletized chemicals into an intermittent demand water system or the like, said feeder including a pressure tank normally having a column of air above the water level therein, a chemical basket disposed in said column of air, means passing fluid to be treated with solutes over pelletized chemicals in said chemical basket, and a normally open safety valve means in said feeder adapted to shut off the passage of fluid through said chemical feeder and through said pelletized chemicals in said basket either responsive to the depletion of the supply of pelletized chemicals in said basket to the extent the rate of feeding of said solutes into the water system is below the required rate and/or responsive to the loss of the normal volume of air under pressure in said pressure tank.

A further object of the invention is to provide a chemical feeder for feeding solutes from pelletized soluble chemicals into a pressurized fluid supply system which will function with a high degree of accuracy to provide a consistent chemical content in fluids withdrawn intermittently from the fluid supply system, even under circumstances of long periods of no-flow through the said fluid supply system.

Other objects of the invention will become apparent by reference to the following detailed description taken in connection with the accompanying drawings, in which:

FIG. 1 is an elevational view of a tank type chemical feeder embodying the invention usable, for example, in a pressurized water supply system.

FIG. 2 is an enlarged sectional view of the upper portion of the embodiment of the chemical feeder disclosed in FIG. 1 showing the fixed pellet basket of the chemical feeder fully loaded and in an operational condition, the water level gage having been omitted.

FIG. 3 is an elevational view of a tank type chemical feeder similar to the embodiment of the invention disclosed in FIGS. 1 and 2, except that a pellet basket controlled automatic safety valve means is provided to shut off the fresh water supply to the feeder responsive to a critical depletion of the charge of pelletized soluble chemicals in the pellet basket and/or responsive to the loss of the normal volume of air under pressure in the top of the feeder causing a substantial rise of the level of the chemically treated water therein.

FIG. 4 is an enlarged sectional view of the upper portion of the embodiment of the chemical feeder disclosed in FIG. 3 with the water level gage omitted, and showing the pellet basket fully charged and the automatic safety valve means employed therein disposed in its normal open position with the fresh water supply uninterrupted thereby.

FIG. 5 is an enlarged elevational view similar to FIG. 4 except that the charge of dissolvable chemical pellets in the pellet basket of the chemical feeder is indicated to be partially consumed, and the automatic safety valve means is shown in a closed position with the fresh water supply to the feeder interrupted.

Referring now to the drawings wherein like reference numerals refer to like and corresponding parts throughout the several views, the illustrative embodiment of the invention disclosed in FIGS. 1 and 2 comprises a tank type chemical feeder 10 employable in a pressure household or industrial water supply system. However, it is to be understood that, although the invention is described and illustrated herein in connection with a household or industrial water supply system, the invention is not limited to such applications inasmuch as it may be employed in many other environments.

The said tank type chemical feeder 10 consists of a closed preferably cylindrical chemically treated water reservoir tank 11 with a pelletized chemical feed means 20 therein located near the top thereof. The said chemically treated water reservoir tank 11 is illustrated to include a cover 110 which is removably secured in sealed relationship over the top thereof by such means as a gasket 111 and bolts 112 extending through a flange 113 provided around the upper periphery of the said tank 11. The said removable cover 110 is employed to provide access to the chemically treated water reservoir tank 11 for the purpose of charging the basket 21 of the chemical feed means 20 with pelletized or lump chemicals 25, and for replenishing the chemical charge when and as required.

The chemically treated water reservoir tank 11 of the feeder 10 is provided with a pressure fresh water inlet 12 in the upper portion thereof from a pressurized source of fresh water indicated by the reference characters PS. Although not shown in the drawings, the pressurized source of fresh water PS is provided with the usual manual shut-off valve which may be used to shut off the supply of fresh water under pressure to the said fresh water inlet 12. The said chemically treated water reservoir tank 11 has a chemically treated water outlet 13 at or near the bottom thereof which is connected by suitable piping, not shown, to points of use such as hose bibs, sinks, bathtubs and the like in the case of household water systems. In either household or industrial points of use, the water use outlets will be valve closed so that the chemically treated water reservoir tank 11 of the feeder 10 will be pressurized by the pressure source of untreated water entering it through its pressure fresh water inlet 12 and the chemical feed means 20 whenever there is no demand withdrawal of chemically treated water CTW from the system.

For illustrative purposes, the chemically treated water reservoir tank 11 of the feeder 10 may be provided with a water column gage 14 as shown in FIG. 1, said gage indicating the height to which chemically treated water CTW will rise under a given pressure source PS of fresh water when the water use outlets in the water system beyond the chemically treated water outlet 13 of the feeder 10 are closed. For example, if the water pressure at the inlet 12 to the chemically treated water reservoir tank 11 is at 30 p.s.i., the water level in the said tank 11 will be substantially as indicated; however, when chemically treated water CTW is withdrawn upon demand from the chemically treated water reservoir tank 11 through the outlet 13 thereof, the fluid pressure of the chemically treated water CTW in the said reservoir tank 11 will drop below 30 p.s.i., and the level of the chemically treated water CTW in the said tank 11 will fall and rise according to the fluid pressure available against the column of air in the upper portion of the said tank 11. The fluid pressure in the treated water reservoir tank 11 is established by the water pressure at the inlet 12 of the said tank 11 modified by the rate of demand through the outlet 13 of the said tank 11.

The chemical feed means generally designated by the numeral 20 consists of a chemical basket 21 preferably formed of an outer tubular shell 210 somewhat smaller in diameter than the inner diameter of the chemically treated water reservoir tank 11, an inner tubular shell 211, and an annular bottom 212 disposed between the said outer and inner tubular shells 210 and 211 preferably located at the bottom thereof. The top of the inner tubular shell 211 of the chemical basket 21 is plugged by such means as a circular plug 213 thereby forming a plenum chamber "X" in the central portion thereof. Suitably fixed within the bottom of the inner tubular shell 210 is a mounting sleeve 22 suitably internally shouldered at its lower end to receive the upper end of a mounting tube 23 which is welded or brazed thereto. The top of the mounting sleeve 22 is preferably located a short distance above the annular bottom 212 of the chemical basket 21.

The fresh water pressure inlet 12 preferably extends through a collar 24 in one side of the chemically treated water reservoir tank 11 to an elbow 120 into which the lower end of the mounting sleeve 22 of the chemical basket 21 is threaded, thusly fixedly mounting the chemical basket 21 in the center of the said chemically treated water reservoir tank 11 with the top of the chemical basket 21 located just below the top of the said tank 11. Fresh water from the fresh water pressure inlet 12 enters the central plenum chamber "X" in the central portion of the chemical basket 21 through the said mounting sleeve 22.

It will be noted that the chemically treated water reservoir tank 11 and the chemical basket 21 of the chemical feeder 10 are in such proportion with respect to each other that, when the said tank 11 is sealed closed, the level of the chemically treated water CTW therein will not raise to the bottom of the chemical basket 21. In the embodiment of the invention disclosed in FIGS. 1 and 2, although the feeder 10 was designed to operate in a household or industrial water system having a fresh water pressure source PS as high as 45 p.s.i., for illustrative purposes an actual pressure source PS of 30 p.s.i. is assumed to be employed.

The inner tubular shell 211 of the chemical basket 21 is provided with a plurality of rows of circumferentially spaced fresh water inlet apertures 15 through which fresh water from the fresh water pressure inlet 12 and the plenum chamber "X" of the chemical basket 21 passes to the chemical compartment "Y" of the chemical basket 21 whenever there is a demand withdrawal at the outlet 13 of the chemically treated water reservoir tank 11 of the feeder 10. The chemical compartment "Y" of the chemical basket 21 is initially filled to the top thereof with pelletized or lump chemicals 25 as indicated in FIG. 2. Chemically treated water is discharged from the said chemical compartment "Y" of the chemical basket 21 through rows of circumferentially spaced chemically treated water outlet apertures 16 in the outer tubular shell 210 thereof into the chemically treated water reservoir tank 11 at the annular space "Z" between the said outer tubular shell 210 of the chemical basket 21 and the inner periphery of the chemically treated water reservoir tank 11 from whence it gravitates to the lower portion of the said tank 11 for withdrawal therefrom through the chemically treated water outlet 13.

The particular size and spacing of the inlet and outlet apertures 15 and 16 in the inner shell 211 and outer shell 210 respectively of the chemical basket 21 are determined according to the rate of dissolution of the pelletized or lump chemicals 22 at the required flow of fresh water through the chemical basket 21 to provide the desired number of parts of chemical per gallon of water passing through the feeder 10. The total area of the outlet apertures 16 in the outer tubular shell 210 of the chemical basket 21 is sufficiently greater than the total area of the inlet apertures 15 in the inner tubular shell 211 thereof so that the level of water passing through the said chemical basket 21 will not substantially rise above the highest row of inlet apertures 15 therein which are preferably located slightly above the elevation of the uppermost row of outlet apertures 16 therein. This maintains the pelletized chemicals above the inlet apertures 15 dry and out of the path of the flow of fresh water being chemically treated by passing through the said chemical basket 21, thereby assuring a substantially uniform chemical content of chemically treated water withdrawn from the feeder 10 upon demand.

The chemical feeder 10 disclosed in FIGS. 1 and 2 illustrating the invention may be employed successfully in pressure water systems and the like wherein the charge of pelletized or lump soluble chemicals 25 in the chemical basket 21 may be inspected and maintained at suitable intervals to assure that the charge of pelletized or lump chemicals does not drop below the upper row of inlet apertures 15 in the inner tubular shell 211 of the chemical basket 21. In the chemical feeder 10, the chemical basket 21 does not become immersed in the chemically treated water CTW within the chemically treated reservoir tank 11 so long as the normal volume of air under pressure remains in the upper portion of the said reservoir tank 11. This factor, plus the location and relative areas of the inlet and outlet apertures 15 and 16 in the chemical basket 21, and the fact that slight deviation in the rate of solubility of the pelletized or lump chemicals as water passes thereover and through the chemical basket 21 is compensated for by the existence of a substantial volume of chemically treated water CTW between withdrawals in the chemically treated reservoir tank 11, all contribute to assure that a substantially uniform chemical content constantly exists in chemically treated water CTW withdrawn from the feeder 10 responsive to intermittent demand at either short or long intervals.

The embodiment of the invention disclosed in FIGS. 3, 4 and 5 comprises a tank type chemical feeder 30 also employable in a pressure household or industrial water supply system. Obviously, the invention is not limited to such applications inasmuch as it may be employed in many other environments.

The chemical feeder 30 of the invention is like and similar to the chemical feeder 10 hereinbefore described except that it employs a normally open sleeve type automatic safety shut-off valve means 50 adapted to shut off the flow of fresh water through the said chemical feeder 30 and through pelletized or lump soluble chemicals 45 in the chemical basket 41 of the chemical feed means 40 thereof either responsive to the depletion of the supply of dissolvable pelletized or lump chemicals 45 in the said chemical basket 41 to the extent that the rate of feeding of solutes into the water system would fall below the required rate and/or responsive to the loss of air pressure in the upper portion of the chemically treated water reservoir tank 31 of the said chemical feeder 30.

The said tank type chemical feeder 30 consists of a closed preferably cylindrical chemically treated water reservoir tank 31 which is provided with a cover 310 which is removably secured in sealed relationship over the top thereof by such means as a gasket 311 and bolts 312 extending through a flange 313 provided around the upper periphery of the said tank 31. The said removable cover 310 provides access to the chemically treated water reservoir tank 31 for the purpose of charging the basket 41 of the chemical feed means 40 thereof with pelletized or lump chemicals 45, and for replenishing the chemical charge when and as required.

The chemically treated water reservoir tank 31 of the feeder 30 is provided with a pressure fresh water inlet 32 in the upper portion thereof from a pressure source of fresh water indicated by the reference character PS. Although not shown in the drawings, the pressurized source of fresh water PS is provided with the usual manual shut-off valve which may be used to shut off the supply of fresh water under pressure to the said fresh water inlet 32. The said chemically treated water reservoir tank 31 has a chemically treated water outlet 33 therein at or near the bottom thereof which is connected by suitable piping, not shown, to points of use such as hose bibs, sinks, bathtubs and the like in the case of household water systems. In either household or industrial points of use, the water use outlets will be valve closed so that the chemically treated water reservoir tank 31 of the feeder 30 will be pressurized by the pressure source of untreated water entering it through its pressure fresh water inlet 32 and the chemical feed means 40 whenever there is no demand withdrawal of chemically treated water CTW from the system.

For illustrative purposes, the chemically treated water reservoir tank 31 of the feeder 30 may be provided with a water column gage 34 as shown in FIG. 3, said gage indicating the height to which chemically treated water CTW will rise under a given pressure source PS of fresh water when the water use outlets in the water system beyond the chemically treated water outlet 33 of the feeder 30 are closed. For example, if the water pressure at the inlet 32 to the chemically treated water reservoir tank 31 is at 30 p.s.i., the water level in the said tank 31 will be substantially as indicated; however, when chemically treated water CTW is withdrawn upon demand from the chemically treated water reservoir tank 31 through the outlet 33 thereof, the fluid pressure of the chemically treated water CTW in the said reservoir tank 31 will drop below 30 p.s.i., and the level of the chemically treated water CTW in the said tank 31 will fall and rise according to the fluid pressure available against the column of air in the upper portion of the said tank 31. The fluid pressure in the treated water reservoir tank 31 is established by the water pressure at the inlet 32 of the said tank 31 modified by the rate of demand through the outlet 33 of the said tank 31.

The chemical feed means generally designated by the numeral 40 consists of a chemical basket 41 preferably formed of an outer tubular shell 410 somewhat smaller in diameter than the inner diameter of the chemically treated water reservoir tank 31, an inner tubular shell 411, and an annular bottom 412 disposed between the said outer and inner tubular shells 410 and 411 located above the lower ends of the said outer and inner tubular shells 410 and 411 providing an annular air compartment 414 in the bottom of the said chemical basket 41. The said air compartment 414 is of sufficient size to float or raise the chemical basket 41 in the event the normal volume of air within the chemically treated water reservoir tank 31 should be lost, as for example, by a leak in the removable cover 310 thereof which would cause the level of the chemically treated water CTW to rise and float the said chemical basket 41 thereby closing the automtaic safety fresh water shut-off valve 50 hereinafter described in detail. The top of the inner tubular shell 411 is plugged by such means as a circular plug 413. Fixed within the inner tubular shell 411 of the chemical basket 41 is a valve sleeve 51 of the said fresh water shut-off valve 50. The top of the valve sleeve 51 is preferably located a short distance above the annular bottom 412 of the chemical basket 41. The bottom of the said valve sleeve 51 is located somewhat above the lower ends of the tubular shells 410 and 411 of the said chemical basket 41 providing a spring chamber 415 to accommodate a compression spring 53 on which the said chemical basket 41 is supported.

The fresh water pressure inlet 32 preferably extends through a collar 44 in one side of the chemically treated water reservoir tank 31 to an elbow 320 centrally thereof into which the lower end of an upwardly disposed fresh water inlet tube 52 is threaded. The said fresh water inlet tube 52 not only forms the fixed element of the normally open sleeve type fresh water safety shut-off valve 50 but functions as means for mounting the chemical basket 41 vertically central within the upper portion of the chemically treated water reservoir tank 31. This is accomplished by the telescoping of the valve sleeve 51 fixed within the inner tubular shell 411 of the chemical basket 41 over the said fresh water inlet tube 52 as best shown in FIGS. 4 and 5.

Between the top of the elbow 320 and the bottom of the valve sleeve 51 of the fresh water safety shut-off valve 50 and around the fresh water inlet tube 52 is disposed a compression spring 53 of suitable strength to support the entire chemical basket 41 in its fully pelletized chemical loaded position shown in FIG. 4 and gradually raise it to its partially spent pelletized chemical load position shown in FIG. 5 as the pelletized chemicals 45 therein become dissolved. The upper end of the fresh water inlet tube 52 is closed by a suitable plug 54. Just below the said plug 54, the fresh water inlet tube 52 is provided with a plurality of fresh water supply ports 55 which are open when the chemical basket 41 is loaded as shown in FIG. 2, and which are closed by the valve sleeve 51 fixed to the inner tubular shell 411 of the said chemical basket 41 when the pelletized chemicals 45 therein are sufficiently spent that further fresh water passing through the chemical compartment "Y" of the chemical basket would produce chemically treated water CTW having less than the required chemical content therein.

Obviously other types of valves may be substituted for the sleeve valve 50; however, it is essential that the said sleeve valve 50 or any valve substituted therefor have as its components means for admitting fresh water to and through the chemical basket 41, and means adapted to open and close said valve responsive to the weight of the charge of pelletized chemicals or the like in the said chemical basket 41. The simple and effective combined chemical basket and valve means hereinabove described has been found to function excellently and is extremely economical.

The chemical basket 41 including the valve sleeve 51 therein is readily assembled onto the ported fresh water inlet tube 52 through the removable cover 310 at the top of the treated water reservoir tank 31, the compression spring 53 first being telescoped over the said inlet tube 52 and seated on the top of the elbow 320 of the fresh water inlet 32.

When a chemical feeder 30 embodying the invention is prepared for use, the chemical basket 41 of the chemical feed means 40 is first charged with pelletized or lump chemicals 45 of the desired dissolving rate, and the cover 310 of the treated water reservoir tank 31 is fixed in sealed relationship thereon. When the said chemical basket 41 is fully charged it assumed the position shown in FIG. 4 with the fresh water control valve 30 open.

Responsive to demand for chemically treated water from the outlet 33 of the feeder 30, fresh water passes from the fresh water pressure inlet 32 through the fresh water supply ports 55 in the fresh water inlet tube 52 of the said fresh water control valve 50 into the plenum chamber "X" of the chemical basket 41 of the chemical feed means 40. Fresh water then passes from the said plenum chamber "X" through the fresh water inlet apertures 35 in the inner tubular shell 411 of the chemical basket 41 into the chemical compartment "Y" thereof, and, after the said fresh water passes through the charge of pelletized or lump chemicals 45 in the said chemical basket 41, it discharges therefrom through the chemically treated water outlet apertures 36 as chemically treated water into the annular space "Z" between the outer tubular shell 410 of the chemical basket 41 and the upper inner wall of the chemically treated reservoir tank 31 from whence it gravitates into the bottom of the said chemically treated reservoir tank 31 ready for demand withdrawal therefrom.

Water under pressure in the treated water reservoir tank 31 creates a column of compressed air thereabove, and keeps the level of the chemically treated water CTW in the treated water reservoir tank 31 below the chemical basket 41 at all times. When chemically treated water CTW is being withdrawn from the chemically treated water reservoir tank 41, the pressure therein drops, and so does the level of the chemically treated water CTW. When the withdrawal of chemically treated water from the said reservoir tank is discontinued, the level of the chemically treated water CTW therein raises to its maximum height depending upon the pressure of the fresh water entering the chemical feeder 30 through the fresh water pressure inlet 32.

As the charge of pelletized or lump chemicals 45 in the chemical basket 41 is reduced to approximately the level of the uppermost rows of fresh water inlet apertures 35 and chemically treated outlet apertures 36 in the said chemical basket 41, the compression spring 53 lifts the said chemical basket 41 from its position shown in FIG. 4 to its position shown in FIG. 5 thereby closing the fresh water safety shut-off valve 50 which serves as a tell-tale at the point of use of chemically treated water that the chemical supply in the chemical feeder 30 requires replenishment.

Also, as an additional safety factor, in the event there is an air pressure leak in the chemically treated water reservoir tank 31 of the chemical feeder 30 such as to cause the level of the chemically treated water CTW therein to rise to a point where the chemical basket 41 would become inundated, the buoyancy provided by the annular air compartment 414 in the bottom of the chemical basket 41 will cause the same to rise and thereby shut off the fresh water safety shut-off valve 50 causing it to serve as a tell-tale at the point of use of chemically treated water that the chemical feeder 30 is not capable of functioning properly.

The fixed chemical basket embodiment of the invention disclosed herein as the chemical feeder 10 and shown in FIGS. 1 and 2 is preferably employed in installations where periodical inspection of the charge in the chemical basket would be routine; however, the safety valved embodiment of the invention disclosed herein as the chemical feeder 31 and shown in FIGS. 3, 4 and 5 is preferably employed whenever an automatic positive indication is required that the charge of chemicals in the chemical basket thereof is spent or that the air pressure in the chemically treated reservoir tank has been lost.

The instant invention provides a very simple, inexpensive chemical feeder for pressure water supply systems where the demand withdrawals are intermittent, leaving no heavy chemical saturation of water remaining in the system between the demand withdrawals. The mechanism employed required little if any, service other than periodical replenishment of pelletized or lump chemicals with which the feeder is charged.

Although but two embodiments of the invention have been disclosed and described in detail, it is obvious that many changes may be made in the size, shape, arrangement and detail of the various elements of the invention, all without departing from the spirit and scope thereof as defined by the appended claims.

I claim:

1. A feeder for dissolving slowly soluble chemicals in pelletized or lump form at a substantially even rate into an intermittent flow fluid system comprising a closed reservoir tank for receiving chemically treated fluid including a fluid inlet means at the upper portion thereof connectable to a source of untreated fluid under pressure and an outlet means at the bottom thereof connectable to a point of intermittent chemically treated fluid demand therefrom, a basket for soluble pelletized chemicals in the top of said reservoir tank spaced therefrom and including partition means therein providing in said basket a closed plenum chamber and an open top chemical chamber, said tank including a removably sealed means through which the open top chemical chamber may be charged, said fluid inlet means to said reservoir tank being connected to said plenum chamber, the lower portion of the partition between said plenum chamber and said chemical chamber having a plurality of fluid passages therethrough communicating with said chemical chamber, the lower portion of said chemical chamber having a plurality of fluid outlet passages therethrough with a total area greater than that of said fluid passages communicating from said plenum chamber to said chemical chamber, the height of the bottom of said chemical basket within said reservoir tank being such that the level of the chemically treated fluid in said tank is always maintained below the said chemical basket by air pressure established within said reservoir tank responsive to fluid under pressure entering said tank when chemically treated fluid is not being withdrawn by demand therefrom, and valve means in said fluid inlet means operable responsive to the weight of a charge of soluble chemicals in said chemical basket closing responsive to depletion of said charge of said soluble chemicals substantially to the level of the uppermost of the fluid passages in said plenum chamber.

2. A feeder for dissolving slowly soluble chemicals in pelletized or lump form at a substantially even rate into an intermittent flow fluid system comprising a closed reservoir tank for receiving chemically treated fluid including a fluid inlet means at the upper portion thereof connectable to a source of untreated fluid under pressure and an outlet means at the bottom thereof connectable to a point of intermittent chemically treated fluid demand therefrom, a basket for soluble pelletized chemicals in the top of said reservoir tank spaced from the wall of said tank including partition means therein providing in said basket a closed plenum chamber and an open top chemical chamber, said tank including a removably sealed means through which the open top chemical chamber may be charged, said fluid inlet means to said reservoir tank being connected to said plenum chamber, the lower portion of the partition between said plenum chamber and said chemical chamber having fluid passages therethrough communicating with said chemical chamber, the lower portion of said chemical chamber having a plurality of fluid outlet passages therethrough with a total area greater than that of said fluid passages communicating from said plenum chamber to said chemical chamber, the height of the bottom of said chemical basket within said reservoir tank being such that the level of the chemically treated fluid in said tank is always maintained below the said chemical basket by air pressure established within said reservoir tank responsive to fluid under pressure entering said tank when chemically treated fluid is not being withdrawn by demand therefrom, and spring loaded valve means disposed in said fluid inlet means normally open responsive to the weight of undissolved chemical pellets in said chemical basket closable upon depletion of a charge of pelletized chemicals therein substantially to the level of the uppermost of the fluid passages in the partition between said plenum chamber and said chemical basket.

3. A feeder for dissolving chemicals in pelletized or lump form at a substantially even rate into an intermittent flow fluid system comprising a closed reservoir tank for receiving chemically treated fluid including a pressure fluid inlet means at the upper portion thereof connectable to a source of untreated fluid under pressure and an outlet means at the bottom thereof connectable to a point of intermittent chemically treated fluid demand therefrom, a basket for soluble pelletized chemicals in the top of said reservoir tank spaced therefrom and including partition means therein providing in said basket a closed plenum chamber and an open top chemical chamber, said tank including a removably sealed means through which the open top chemical chamber may be charged, said pressure fluid inlet means being connected to said plenum chamber, the lower portion of the partition between said plenum chamber and said chemical chamber having a plurality of fluid passages therethrough communicating with said chemical chamber, the lower portion of said chemical chamber having a plurality of fluid outlet passages therethrough with a total area greater than that of said fluid passages communicating from said plenum chamber to said chemical chamber, the height of the bottom of said chemical basket within said reservoir tank being such that the level of the chemically treated fluid in said tank is always maintained below the said chemical basket by air pressure established within said reservoir tank responsive to fluid under pressure entering said tank when chemically treated fluid is not being withdrawn by demand therefrom, and normally open valve means in the fluid inlet means supplying fluid under pressure to the chemical chamber of said chemical basket operable responsive to the weight of a charge of pelletized chemicals in said chemical compartment shutting off the fluid pressure inlet means when said pelletized chemical charge becomes depleted substantially to the level of the upermost of the fluid passages in said chemical chamber.

4. A feeder for dissolving chemicals in pelletized or lump form at a substantially even rate into an intermittent flow fluid system comprising a closed reservoir tank for receiving chemically treated fluid including a pressure fluid inlet means at the upper portion thereof connectable to a source of untreated fluid under pressure and an outlet means at the bottom thereof connectable to a point of intermittent chemically treated fluid demand therefrom, a basket for soluble pelletized chemicals in the top of said reservoir tank spaced therefrom and including partition means therein providing in said basket a closed plenum chamber and an open top chemical chamber, said tank including a removably sealed means through which the open top chemical chamber may be charged, said pressure fluid inlet means being connected to said plenum chamber, the lower portion of the partition between said plenum chamber and said chemical chamber having a plurality of fluid passages therethrough communicating with said chemical chamber, the lower portion of said chemical chamber having a plurality of fluid outlet passages therethrough with a total area greater than that of said fluid passages communicating from said plenum chamber to said chemical chamber, the height of the bottom of said chemical basket within said reservoir tank being such that the level of the chemically treated fluid in said tank is always maintained below the said chemical basket by air pressure established within said reservoir tank responsive to fluid under pressure entering said tank when chemically treated fluid is not being withdrawn by demand therefrom, normally open valve means in the fluid inlet means supplying fluid under pressure to the chemical chamber of said chemical basket operable responsive to the weight of a charge of pelletized chemicals in said chemical compartment shutting off the fluid pressure inlet means when said pelltized chemical charge becomes depleted substantially to the level of the uppermost of the fluid passages in said chemical chamber, and means mounting said chemical basket for limited vertical movement in said tank, valve means in the fluid inlet means supplying fluid under pressure to the chemical chamber of said chemical basket normally open when said chemical basket is in its lowermost position, said chemical basket including a float chamber at the bottom thereof, said valve means being operable responsive to the float chamber raising the said chemical basket in the event the normal level of chemically treated fluid in said tank rises sufficiently to float said chemical basket due to a loss of the normal volume of air in the top of said tank.

References Cited in the file of this patent

UNITED STATES PATENTS

| | | |
|---|---|---|
| 254,364 | O'Grady | Feb. 28, 1882 |
| 412,910 | Blessing | Oct. 15, 1889 |
| 1,242,905 | Atkinson | Oct. 16, 1917 |
| 1,693,829 | Sweeney | Dec. 4, 1928 |

FOREIGN PATENTS

| | | |
|---|---|---|
| 11,416 | Great Britain | May 26, 1908 |